United States Patent [19]
Price et al.

[11] Patent Number: 6,048,389
[45] Date of Patent: Apr. 11, 2000

[54] INK JET INKS CONTAINING MODIFIERS FOR IMPROVED DROP FORMATION

[75] Inventors: Brian G. Price; David Erdtmann; Douglas E. Bugner, all of Rochester, N.Y.

[73] Assignee: Eastman Kodak Company, Rochester, N.Y.

[21] Appl. No.: 09/025,162

[22] Filed: Feb. 18, 1998

[51] Int. Cl.⁷ .................................................. C09D 11/00
[52] U.S. Cl. ..................................... 106/31.37; 106/31.69
[58] Field of Search .............................. 106/31.37, 31.69, 106/31.58, 31.86

[56] References Cited

U.S. PATENT DOCUMENTS

| | | | |
|---|---|---|---|
| 4,777,248 | 10/1988 | Greenwood | 106/31.48 |
| 4,818,614 | 4/1989 | Fukui et al. | 428/403 |
| 5,176,745 | 1/1993 | Moore et al. | 106/22 |
| 5,531,818 | 7/1996 | Lin et al. | 106/31.28 |

*Primary Examiner*—Helene Klemanski
*Assistant Examiner*—Veronica F. Faison
*Attorney, Agent, or Firm*—Harold E. Cole

[57] ABSTRACT

An ink jet ink composition comprising a vehicle; a colorant; and a polymer having a molecular weight between 200,000 and 40 million g/mol.

19 Claims, No Drawings

INK JET INKS CONTAINING MODIFIERS FOR IMPROVED DROP FORMATION

FIELD OF THE INVENTION

This invention relates to aqueous inks which utilize pigments or dyes as colorants and which are useful for ink jet printing applications. Specifically, this invention relates to additives to ink jet inks which improve drop formation and merging properties when multiple droplets are simultaneously fired during drop-on-demand deposition of ink onto a receiver.

BACKGROUND/PRIOR ART

The ink formulations of the present invention are employed in imaging processes which involve the application of liquid ink droplets in a pixel-by-pixel manner to an ink-receiving element. There are numerous schemes that may be utilized to control the deposition of ink droplets on the image-recording element to yield the desired image. In one process, known as continuous ink jet, a continuous stream of droplets is charged and deflected in an imagewise manner onto the surface of the image-recording element, while unimaged droplets are caught and returned to the ink sump. In another process, known as drop-on-demand ink jet, individual ink droplets are projected as needed onto the image-recording element to form the desired image. Common methods of controlling the projection of ink droplets in drop-on-demand printing include piezoelectric transducers and thermal bubble formation.

The inks used in the various ink jet printers can be classified as either dye-based or pigment-based. A dye is a colorant which is molecularly dispersed or solvated by the carrier medium. The carrier medium can be a liquid or a solid at room temperature. A commonly used carrier medium is water or a mixture of water and organic cosolvents. In dye-based inks, each individual dye molecule is surrounded by molecules of the carrier medium, i.e. no particles are observable under a microscope.

In pigment-based inks, the colorant exists as discrete particles. These pigment particles are usually treated with addenda known as dispersants or stabilizers, which serve to keep the pigment particles from agglomerating and/or settling out.

In addition to the colorant, other ingredients are also commonly added to ink jet inks. For example, cosolvents are added to help prevent the ink from drying out or crusting in the orifices of the printhead or to help the ink penetrate the receiving substrate, especially when the substrate is a highly sized paper. Examples of cosolvents which have been used in ink jet inks include glycols, including propylene glycol, polypropylene glycol, ethylene glycol, polyethylene glycol, diethylene glycol, tetraethylene glycol, and mixtures and derivatives thereof.

In ink jet inks which are fired through drop-on-demand thermal printheads, the amount of humectant should be minimized to prevent the ink viscosity from becoming too high, making the ink unable to be fired. High concentrations of humectant may also result in poor image quality and poor drying times. In ink jet inks, which are fired through certain types of drop-on-demand piezoelectric transducers, the viscosity of the inks tends to be higher than inks for thermal drop-on-demand inks. Typically, the viscosity of ink jet inks for use with shear mode piezoelectric printheads should be in the range of 4–20 centipoise. In the past, this has been achieved by adding high levels of humectants, typically in the range of 30–70 wt %. This can result in poor image quality, pigment and/or dye stability and degradation problems, and poor drying times.

In drop-on-demand ink jet printing it would be desirable to fire multiple droplets simultaneously at a given pixel location and have them merge, forming a single drop prior to reaching the receiver. As described herein, a discrete unit of ink issuing from a nozzle is defined as a "droplet." The merging of two or more droplets results in a "drop." After issuing from the nozzle, a droplet may break up into smaller particles and form an aerosol. These smaller particles are "subdroplets."

Image quality could be greatly improved, if one had the ability to fire any number of droplets, say between 0 and 16, at a given pixel location and have the droplets merge together to form a single drop prior to reaching the receiver. Currently, the simultaneous firing of more than one droplet from a given nozzle produces images that have poor image quality. This is due to the ink droplets not merging prior to reaching the receiver. It is possible to merge a small number of droplets, say 1–5 droplets, by increasing the low shear viscosity of the ink jet ink. This increase in viscosity is typically accomplished by increasing the amount of humectant in the ink. However, one would like to be able to merge a larger number of droplets, without the aforementioned tradeoffs of having large concentrations of humectants in the ink jet ink.

EP 0 787 778 A1 discloses the use of polyacrylamides and polyvinylpyrrolidones having a molecular weight of 10,000 and 30,000 respectively "To effectively decrease the formation of aerosol, the viscoelastic polymer component is employed within the range of about 5 to 10 ppm. It has been determined experimentally that an ink-jet ink composition employing only 2 ppm of a polyacrylamide is not benefited by reduced aerosol formation. On the other hand, ink-jet compositions employing more than 10 ppm of a polyacrylamide exhibit pseudo-plastic effects (i.e., "rubberbanding") that are counterproductive to ink-jet printing. Moreover, precipitation might occur at concentratoins higher than about 10 ppm. Preferably, the viscoelastic polymer is employed at about 10 ppm." Page 3, lines 48–53.

While the conditions outlined in EP 0 787 778 A1 may help prevent a single droplet from breaking into sub-droplets (thereby forming an aerosol) (FIG. 1E), the molecular weight of the preferred and exemplified polymers is too low to facilitate the merging of multiple droplets to form drops, as is desired in the instant invention.

What is needed, then, is an ink jet ink formulation or method, other than the use of high concentrations of humectant, that will facilitate the merging of ink droplets before they reach the receiver.

SUMMARY OF THE INVENTION

We have unexpectedly found that improved ink jet ink droplet merging and drop placement can be achieved by the addition of very small amounts of high molecular weight, water soluble polymers. Benefits are most apparent when the molecular weight of the polymer is at least 200,000 (g/mol). The concentration of the high molecular weight polymer should be within the range from about 1 ppm to 500 ppm.

By allowing a larger number of ink droplets to merge prior to reaching the receiver through the addition of only a small amount of dissolved polymer, this invention offers an advantage over the prior art's use of high concentrations of humectants. Thus, the amount of humectant can be reduced to a level that does not cause poor image quality or drying problems.

The present invention provides an ink jet ink composition comprising a vehicle; a colorant; and a polymer having a molecular weight between 200,000 and 40 million g/mol.

DETAILED DESCRIPTION OF THE INVENTION

Inks useful for ink jet recording processes generally comprise at least a mixture of a vehicle and a colorant. The vehicle may be aqueous or non-aqueous and the colorant is either a pigment or a dye. The preferred vehicle is aqueous, preferably de-ionized water.

The preferred embodiments of the present invention are aqueous ink jet inks comprising a colorant and a water soluble, high molecular weight polymer. Useful water-soluble polymers, include poly(ethylene oxide), 2-hydroxyethylcellulose, and deoxyribonucleic acid (DNA). The molecular weight of the polymers can vary between 200,000 and 40 million (g/mol), preferably between 5 and 40 million and most preferably between 400,000 and 1 million (g/mol). The concentration of polymer in the ink can range from 1 ppm to 500 ppm, preferably 1 to 4.5 and 10.5 to 50 and most preferably between 5 and 50 ppm.

Pigmented inks are most commonly prepared in two steps:

1. a pigment milling step in which the as-received pigment is deaggregated into its primary particle size, and
2. a dilution step in which the pigment mill grind is converted into a useable ink.

Processes for preparing pigmented ink jet inks involve blending the pigment, an additive known as a stablizer or dispersant, a liquid carrier medium, grinding media, and other optional addenda such as surfactants and defoamers. This pigment slurry is then milled using any of a variety of hardware such as ball mills, media mills, high speed dispersers, and roll mills. Such processes are fully described in U.S. Pat. No. 5,651,813, the contents of which are incorporated herein in its entirety.

In the practice of the present invention, any of the known pigments can be used. The exact choice of pigment will depend upon the specific color reproduction and image stability requirements of the printer and application. For a list of pigments useful in ink jet inks, see U.S. Pat. No. 5,085,698, column 7, line 10 through column 8, line 48.

A dispersant can be an important ingredient in the mill grind particularly where the colorant is a pigment. Although there are many dispersants known in the art, the choice of the most useful dispersant will be a function of the carrier medium and the pigment being used. Preferred dispersants for aqueous ink jet inks include sodium dodecyl sulfate, acrylic and styrene-acrylic copolymers, such as those disclosed in U.S. Pat. Nos. 5,085,698 and 5,172,133, and sulfonated styrenics, such as those disclosed in U.S. Pat. No. 4,597,794. Most preferred dispersants are salts of oleyl methyl tauride.

In the practice of the present invention, any of the known dyes can be used. The exact choice of dye will depend upon the specific color reproduction and image stability requirements of the printer and application. For a list of dyes useful in ink jet inks, see U.S. Pat. No. 5,605,566, column 2, line 37 through column 3, line 38.

The vehicle (liquid carrier medium) can also vary widely and again will depend on the nature of the ink jet printer for which the inks are intended. For printers which use aqueous inks, water, or a mixture of water with miscible organic co-solvents, is the preferred vehicle.

Other ingredients are also commonly added to ink jet inks. Cosolvents (0–70 wt % of the entire ink composition), acting as humectants, may be added to help prevent the ink from drying out or crusting in the orifices of the printhead or to help the ink penetrate the receiving substrate. Examples of cosolvents which have been used in ink jet inks as humectants include diols, including ethanediols, propanediols, propanetriols, butanediols, pentanediols, and hexanediols; glycols, including propylene glycol, polypropylene glycol, ethylene glycol, polyethylene glycol, diethylene glycol, tetraethylene glycol, and mixtures and derivatives thereof. Preferred cosolvents for the inks of the present invention are glycerol, ethylene glycol, and diethylene glycol, and mixtures thereof, at concentrations ranging from 5 to 70 wt % of the entire ink composition.

A biocide (0.0005–0.5 wt % of the ink compostion) may be added to prevent unwanted microbial growth which may occur in the ink over time. A preferred biocide for the inks of the present invention is Proxel™ GXL (obtained from Zeneca Colours) at a final concentration of 0.0005–0.5 wt % of the composition.

Other optional additives which may be present in ink jet inks include thickeners, conductivity enhancing agents, anti-kogation agents, drying agents, and defoamers.

In the present invention, an especially important additive is a linear, water soluble polymer having a high molecular weight.

Examples of water soluble polymers which can be used in the scope of the invention include a polysaccharide, such as a hydroxyethylcellulose, carboxymethylcellulose, hydroxypropylcellulose, derivatized chitin, derivatized starch, carrageenan, and pullulan; DNA, proteins, poly (styrenesulfonic acid), poly(styrene-co-maleic anhydride), poly(alkyl vinyl ether-co-maleic anhydride), polyacrylamide, partially hydrolyzed polyacrylamide, poly (acrylic acid), poly(vinyl alcohol), partially hydrolyzed poly (vinyl acetate), poly(hydroxyethyl acrylate), poly(methyl vinyl ether), polyvinylpyrrolidone, poly(2-vinylpyridine), poly(4-vinylpyridine), poly(diallyldimethylammonium chloride) and the like.

Thus the ink jet ink composition of the invention comprises:

a) a liquid vehicle;

b) 0.25 to 10.00 weight percent of a colorant;

c) 1 to 500 ppm of a polymer dissolved in the vehicle; and d) 0 to 10 weight percent dispersant.

Optional additives include:

a) 5 to 70 weight percent humectant;

b) 0.0005 to 0.5 weight percent biocide; and c) 0.05 to 1.0 weight percent surfactant.

We have unexpectedly found that droplet merging and drop placement can be improved when ink jet inks containing high molecular weight water soluble polymers are added, where the molecular weight of the polymer is between 200,000 and 40 million, and the concentration is between 1 ppm and 500 ppm. Most preferred is poly (ethylene oxide) having a molecular weight between 400,000 and 1,000,000, at concentrations ranging from 5 to 50 ppm. Generally, a very useful composition comprises a polymer with a molecular weight between 1 million and 5 million g/mol in a concentration between 10.5 and 50 ppm.

EXAMPLES

| Materials: | |
|---|---|
| Chemical | Company |
| Quinacridone Magenta P.R. 122 | Sun Chemical |
| Oleoyl methyl taurine (OMT) | Eastman Kodak |
| Proxel ™ GXL biocide | Zeneca |
| Diethylene glycol | Aldrich Chemicals |
| Glycerol | Aldrich Chemicals |
| Pro-Jet ™ FAST BLACK 2 | Zeneca |
| Surfynol ™ 485 surfactant | Air Products |
| Polyacrylamide 10k MW (CAS#9003-05-6 cat#43,493-9) | Aldrich Chemicals |
| Polyvinylpyrrolidone 29k MW (CAS#9003-39-8, cat#23,425-7) | Aldrich Chemicals |
| Poly(ethylene oxide) 917k MW (CAS#25322-68-3, cat#343) | Scientific Polymer Products |
| 2-Hydroxyethylcellose 1,300k MW (CAS#9004-62-0, cat#43,498- 1) | Aldrich Chemicals |
| DNA (27-4564-01, lot:4124564011) | Pharmacia Biotech |
| Comparative Example A Mill Grind | |
| Polymeric beads, mean diameter 325.0 g (milling media) | of 50 μm |
| Quinacridone Magenta (p.r. 122) Manufactured by Sun Chemical | 30.0 g |
| Oleoyl methyl taurine, (OMT) sodium salt | 9.0 g |
| Deionized water | 208.0 g |
| Proxel ™ GXL (biocide from Zeneca) | 0.2 g |

The above components were milled using a high energy media mill manufactured by Morehouse-Cowles Hochmeyer. The mill was run for 10 hours at room temperature. An aliquot of the above dispersion to yield 1.45 g pigment was mixed with 6.00 g diethylene glycol, and additional deionized water for a total of 50.0 g. This ink was filtered through 3-μm filter and introduced into an empty piezo-electric print cartridge. Poor drop placement with no droplet merging was observed.

Comparative Example B

An ink was prepared similar to Comparative Example A, except that 20.0 grams of glycerol was added, and additional deionized water for a total of 50.0 g.
Excellent drop placement with partial merging at droplet numbers up to 10 was observed.

Comparative Example C

An ink was prepared similar to Comparative Example A, except that the magenta pigment was replaced by 26.4 g of a 3.60% solution of Zeneca Pro-Jet™ Black dye, and 0.50 g of Air Products Surfynol® 485 was added, and additional deionized water for a total of 50.0 g.
Poor drop placement with no droplet merging was observed.

Polymer Additive Examples

In each of the following examples, the polymer additive was first prepared in 10,000 ppm (wt./vol.) stock solutions in deionized, distilled water. In each case, the polymer was allowed to dissolve fully without stirring, so as not to impart shear rates which might be of sufficient magnitude as to cause mechanical degradation of the polymer chains. Once fully dissolved, the stock solutions were diluted to 1,000 ppm. Finally, the appropriate stock solution was added in 1 part per 100 parts appropriately concentrated ink formulation to yield test inks of desired polymer additive concentration.

Comparative Example D

PAM 10 k MW –10 ppm

Polyacrylamide (10 k MW) was purchased from Aldrich Chemical and used as received in the ink formulation of Comparative Example A. The concentration of the added polyacrylamide in the ink was 10 ppm. Poor drop placement with no droplet merging was observed.

Comparative Example E

PAM 10 k MW –100 ppm

Polyacrylamide (10 k MW) from the same initial stock solution as that used in Comparative Example D. was used, but in higher concentration in the ink formulation of Comparative Example A. The concentration of the added polyacrylamide in the ink was 100 ppm. Poor drop placement with no droplet merging was observed.

Comparative Example F

PVP 29 k MW –10 ppm

Polyvinylpyrrolidone (29 k MW) was purchased from Aldrich Chemical and used as received in the ink formulation of Comparative Example A. The concentration of added PVP was 10 ppm in this example. Poor drop placement with no droplet merging was observed.

Comparative Example G

PVP 29 k MW –100 ppm

Polyvinylpyrrolidone (29 k MW) from the same initial stock solution was used, but in higher concentration in the ink formulation of Comparative Example A. The concentration of PVP was 100 ppm in this example. Poor drop placement with no droplet merging was observed.

Example 1

PEO 917 k MW

Poly(ethylene oxide) (PEO) (917 k MW) was purchased from Scientific Polymer Products and was used as received in the ink formulation of Comparative Example A. The concentration of PEO was 10 ppm in this example. Excellent drop placement with droplet merging for all discrete droplet numbers was observed.

Example 2

Comp. Ex. B +10 ppm PEO 917 k

PEO (917 k MW) from the same initial solution as Example 1. was used in the higher viscosity ink formulation of Comparative Example B. The concentration of PEO in this example was 10 ppm. Excellent drop placement and merging were observed at all droplet numbers.

Example 3

PEO (917 k MW) from the same initial solution as Example 1. was used in the dye-based ink formulation of Comparative Example C. The concentration of PEO in this example was 10 ppm. Excellent drop placement with merging was observed at droplet numbers up to 4. Good drop placement with partial merging was observed at droplet number of 10.

Example 4

HEC 1.3M MW

2-Hydroxyethylcellulose (1,300 k MW) was purchased from Aldrich and was used as received in the ink formulation of Comparative Example A. The concentration of HEC in this example was 100 ppm. Good drop placement with droplet merging was observed at droplet numbers up to 4 and partial merging was observed at droplet numbers up to 10.

Example 5

DNA 40M MW

DNA was purchased from Pharmacia Biotech and used as received in the ink formulation of Comparative Example A. The sample was characterized by gel electrophoresis and determined to contain a wide range of molecular weights including a significant fraction at approximately 40 million (g/mol). The concentration of DNA in this example was 100 ppm. Good drop placement with droplet merging was observed at droplet numbers up to 4 and partial merging was observed at droplet numbers up to 10.

nozzle at a waveform amplitude constant throughout all samples, and observing the behavior of the ink sample when fired at discrete droplet numbers 2, 4, and 10.

Drop placement was determined by stability of the path of droplets issuing from a given nozzle. Light scattered by a droplet appears as a line of higher intensity in the imaging system, the number and time-dependence of which being a measure of ultimate drop placement. Inks were rated as forming paths of poor, good, or excellent stability; where poor indicates strong time dependence, good indicates occasional deviations from a time independent path, and excellent indicates a single path is followed by all droplets and drops.

Merging was evaluated at 1 mm from the nozzle. Discrete droplets either did not merge (N), merged partially (PM), or merged completely (M) by the 1 mm mark. Partial merging indicates that the number of distinct ink subdroplets, droplets, and drops of all sizes passing the 1 mm point is less than the number of droplets issued from the nozzle.

Examples 1–5 and Comparative Examples A–G, are summarized in the following table.

TABLE 1

| Example | Colorant | Additive | Polymer Molecular Weight (g/mol) | Additive Amount (ppm) | Discrete Droplet Number 2 | 4 | 10 | Placement P/G/E |
|---|---|---|---|---|---|---|---|---|
| Comp. A | Pigment | — | — | 0 | N | N | N | P |
| Comp. B | Pigment | — | — | 0 | M | M | PM | E |
| Comp. C | Dye | — | — | 0 | N | N | N | P |
| Comp. D | Pigment | PAM | 10k | 10 | N | N | N | P |
| Comp. E | Pigment | PAM | 10k | 100 | N | N | N | P |
| Comp. F | Pigment | PVP | 30k | 10 | N | N | N | P |
| Comp. G | Pigment | PVP | 30k | 100 | N | N | N | P |
| Example 1 | Pigment | PEO | 917k | 10 | M | M | M | E |
| Example 2 | Pigment | PEO | 917k | 10 | M | M | M | E |
| Example 3 | Dye | PEO | 917k | 10 | M | M | PM | G |
| Example 4 | Pigment | HEC | 1.3M | 100 | M | M | PM | G |
| Example 5 | Pigment | DNA | 40M | 100 | M | M | PM | G |

Key
M — merged, PM — partially merged, N — not merged P — poor, G — good, E — excellent

Ink Characterization and Evaluation

The experimental setup for the characterization of drop formation consists of the following: ink jet head with an ink reservoir, head support electronics, microscope objective with zoom capabilities attached to a video camera, a strobe light, a video display, and printer. The head/reservoir subsystem facilitates the introduction of various ink formulations for testing. The video camera/display/printer subsystem permits the viewing and capture of the droplet formations. The microscope objective (with zoom), which is attached to the video camera, provides the appropriate magnification (200–1000×) for viewing the droplets across the working distance, typically 1 mm. The illumination for video capture of the drop formations is provided by a strobe light. In addition, the support electronics for the strobe system permits the user to determine time-of-flight, or indirectly, average drop velocity. The support electronics for ink jet head permits the user to vary the drive voltage, firing frequency, head temperature, and the number of drops per firing cycle. This test setup facilitates the characterization of various ink formulations, in particular drop formation and average drop velocity.

The evaluation of each of the examples consisted of loading the reservoir with the ink formulation, firing a single The results indicate that significant enhancement of droplet merging and drop placement can be achieved with the addition of a high molecular weight polymer to the ink jet ink.

The invention has been described in detail with particular reference to certain preferred embodiments thereof, but it will be understood that variations and modifications can be effected within the spirit and scope of the invention.

What is claimed is:

1. An ink jet ink composition comprising a vehicle; a colorant; and a water soluble polymer having a molecular weight between 200,000 and 40 million g/mol, the concentration of said polymer in said ink composition being between 1 and 500 ppm, said polymer being a poly(ethylene oxide), polysaccharide or deoxyribonucleic acid.

2. The ink jet ink composition of claim 1 wherein the polymer is dissolved in the vehicle.

3. The ink jet ink composition of claim 1 wherein the colorant is selected from a pigment and a dye.

4. The ink jet ink composition of claim 1 or 2 wherein the vehicle is selected from aqueous and non-aqueous.

5. The ink jet composition of claim 1 wherein the molecular weight of the polymer is between 5 to 40 million g/mol.

6. The ink jet ink composition of claim 1 wherein the molecular weight of the polymer is between 400,000 and 1 million g/mol.

7. The ink jet ink composition of claim 1 wherein the molecular weight of the polymer is between 200,000 and 5 million g/mol.

8. The ink jet ink composition of claim 1 wherein the concentration of polymer in the ink composition is between 5 and 50 ppm.

9. The ink jet ink composition of claim 1 wherein the concentration of polymer in the ink composition is between 1 and 4.5 ppm.

10. The ink jet ink composition of claim 1 wherein the concentration of polymer in the ink composition is between 10.5 and 50 ppm.

11. The ink jet ink composition of claim 1 wherein the molecular weight of the polymer is between 1 million and 5 million g/mol.

12. The ink jet ink composition of claim 1 wherein the molecular weight of the polymer is between 1 million and 5 million g/mol and the polymer concentration is between 10.5 and 100 ppm.

13. The ink jet ink composition of claim 1 wherein the polymer is poly(ethylene oxide), and the polymer concentration is 10.5 to 100 ppm.

14. The inkjet ink composition of claim 1 wherein the polymer is a polysaccharide and the polymer concentration is 10.5–100 ppm.

15. The ink jet ink composition of claim 1 wherein the polymer is DNA and the polymer concentration is 10.5–100 ppm.

16. The ink jet ink composition of claim 1 comprising:
a) a liquid vehicle;
b) 0.25 to 10.00 weight percent of a colorant;
c) 1 to 500 ppm of a polymer dissolved in the vehicle; and
d) 0 to 10 weight percent dispersant.

17. The ink jet ink composition of claim 16 further comprising:
a) 5 to 70 weight percent humectant;
b) 0.0005 to 0.5 weight percent biocide; and
c) 0.05 to 1.0 weight percent surfactant.

18. A method of making an image on an ink receiver comprising:
(a) providing a mixture of a colorant, a vehicle and a polymer having a molecular weight between 200,000 and 40 million g/mol to obtain an ink jet ink composition having a colorant concentration suitable for ink jet printers, the concentration of said polymer in said ink composition being between 1 and 500 ppm, said polymer being a poly(ethylene oxide), polysaccharide or deoxyribonucleic acid; and
(b) printing said ink jet ink composition on a print medium by means of an ink jet apparatus.

19. A method of improving drop merging in ink jet printing comprising:
(a) formulating the ink jet ink composition of claim 1; and
(b) printing said ink jet ink composition on a print medium by means of an ink jet apparatus, whereupon drop merging by said ink is substantially improved.

* * * * *